UNITED STATES PATENT OFFICE.

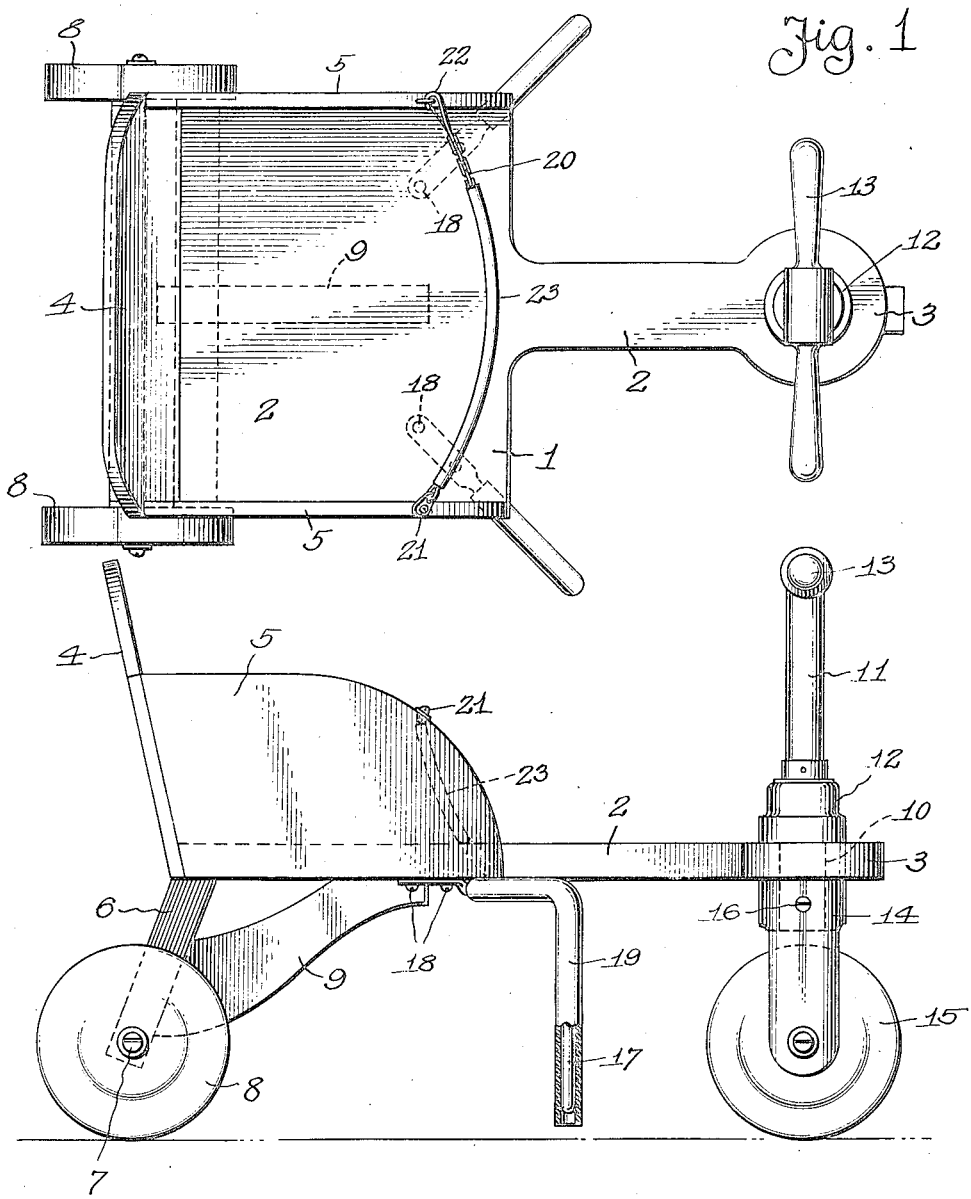

FRANCIS J. SCHROEDER, OF DETROIT, MICHIGAN.

CHILD'S CART.

1,384,160.  Specification of Letters Patent.  Patented July 12, 1921.

Application filed November 3, 1919. Serial No. 335,350.

*To all whom it may concern:*

Be it known that I, FRANCIS J. SCHROEDER, a citizen of the United States of America, residing at Detroit, in the county of Wayne and State of Michigan, have invented certain new and useful Improvements in Children's Carts, of which the following is a specification, reference being had therein to the accompanying drawings.

My invention aims to provide a simple, and inexpensive child's cart or small vehicle which will permit of a child safely propelling the cart and guiding the same in a desired direction, besides affording considerable amusement and exercise for the child. The cart is constructed so that it will not accidentally capsize particularly when making a sharp turn, and provision is made for safely supporting the child in the cart and at the same time afford a degree of comfort.

My invention will be hereinafter specifically described and then claimed, and reference will now be had to the drawing, wherein—

Figure 1 is a plan of the cart; and

Fig. 2 is a side elevation of the same, partly broken away and partly in section.

The cart comprises a seat board 1 substantially rectangular in plan and the front edge of the seat board has a central tongue or extension 2 terminating in a head 3.

Connected to the rear edge of the seat board 1 is an inclined back board 4 and connecting the side edges of said back board to the side edges of the seat board 1, are side boards 5 of less height than the back board 4, the boards 1, 4 and 5 providing an inclosure for the body of a child whose limbs may extend downwardly at the front edge of the seat board 1 and at the sides of the tongue or extension 2, so that the feet may rest on the ground or in proximity thereto.

Extending rearwardly at an inclination from the lower edge of the seat board 1 is a transverse axle member 6 that may be provided with an axle 7 or studs for revoluble rear wheels 8. The axle member 6, intermediate the side edges thereof, has its central portion connected by a brace 9 to the lower face of the seat board 1, and in this manner the axle member 6 is rigidly held relative to the seat board.

Loosely extending through the head 3 of the seat board tongue or extension 2 is a stem 10 of a steering post 11 which is supported relative to the head 3 by a collar 12 on the steering post bearing on said head. The steering post 11 has its upper end provided with a transverse handle 13 and the stem 10 of said steering post extends into a yoke or stirrup 14 having a revoluble steering wheel 15 journaled therein, said yoke or stirrup being fixed relative to the stem 10 by a screw 16 or other fastening means. It is therefore possible for a child sitting on the seat board 1 to grip the handle 13 and steer the wheel 15 so that when the cart is propelled by the feet, the cart may be guided in any desired direction.

To prevent the cart from tilting sidewise when making a sharp turn or rounding a corner with considerable speed, the front edge of the seat board 1, at the sides thereof, has outwardly extending angular legs 17, preferably in the form of inverted L-shaped rods having the upper or lateral ends thereof flattened and connected to the lower face of the seat board 1, as at 18. The lower ends of the legs 17 are adapted to extend in proximity to the ground and said legs are provided with yieldable covers 19 having the lower ends thereof protruding below the lower ends of said legs, as best shown in Fig. 2, so that the lower yieldable ends of the covers 19 will serve somewhat as cushion members when the cart tilts. The covers 19 may be made from hose or tubing and said covers will also protect the limbs of a child from being seriously injured by contacting with the metallic legs.

As further contributing to the safety of the child on the seat board 1 there is a transverse guard 20 connecting the side boards 5, said transverse guard being preferably in the form of a chain or flexible member having one end thereof fixed, as at 21, to one of the side boards 5 and the opposite end thereof detachably connected, as at 22 to the other side board. On the guard 20 is placed a cover 23 made similar to the leg covers 19.

From the foregoing it will be observed that the greater part of the child's cart can be made of wood and finished to present a neat and attractive appearance, and while in the drawing there is illustrated a preferred embodiment of my invention, it is to be understood that the structural elements are susceptible to such variations and modifications as fall within the scope of the appended claim.

What I claim is:—

In a child's three wheel cart having a seat board, two wheels at the rear end thereof, and a steering wheel at the forward end of said board; an axle member for the two rear wheels said member being disposed at an angle so as to maintain the two rear wheels in a plane behind the plane of the rear edge of the seat board to prevent rearward tilting thereof by a child on the seat board, and angular legs having flattened ends secured to the lower face of the seat board at the side edges and forward end thereof and having lower ends well outside of the planes of travel by the rear wheels to prevent side tilting of the cart.

In testimony whereof I affix my signature in the presence of two witnesses.

FRANCIS J. SCHROEDER.

Witnesses:
KARL H. BUTLER,
ANNA M. DORR.